United States Patent
Wertli

(10) Patent No.: US 9,891,132 B2
(45) Date of Patent: Feb. 13, 2018

(54) METHOD FOR LEAK TESTING CLOSED, AT LEAST PARTIALLY GAS FILLED CONTAINERS

(75) Inventor: Anton Wertli, Wohlen (CH)

(73) Assignee: WILCO AG, Wohlen (CH)

( * ) Notice: Subject to any disclaimer, the term of this patent is extended or adjusted under 35 U.S.C. 154(b) by 0 days.

(21) Appl. No.: 13/380,187

(22) PCT Filed: Jul. 1, 2009

(86) PCT No.: PCT/EP2009/058272
§ 371 (c)(1),
(2), (4) Date: Mar. 7, 2012

(87) PCT Pub. No.: WO2011/000422
PCT Pub. Date: Jan. 6, 2011

(65) Prior Publication Data
US 2012/0160014 A1 Jun. 28, 2012

(51) Int. Cl.
*G01M 3/38* (2006.01)
*G01M 3/22* (2006.01)

(52) U.S. Cl.
CPC .............. *G01M 3/38* (2013.01); *G01M 3/229* (2013.01)

(58) Field of Classification Search
USPC .................................. 73/49.3, 49.7
See application file for complete search history.

(56) References Cited

U.S. PATENT DOCUMENTS

| | | | | |
|---|---|---|---|---|
| 4,382,679 A * | 5/1983 | Lee | .............................. | 356/239.4 |
| 5,163,315 A * | 11/1992 | Asai et al. | ...................... | 73/40.7 |
| 5,237,855 A * | 8/1993 | Gates | .............................. | 73/45.5 |
| 5,307,139 A * | 4/1994 | Tyson et al. | .................. | 356/35.5 |
| 5,907,093 A | 5/1999 | Lehmann | | |
| 6,639,678 B1 * | 10/2003 | Veale | .............................. | 356/437 |
| 6,729,177 B2 * | 5/2004 | Shioya et al. | .................. | 73/40.7 |
| 6,857,307 B2 * | 2/2005 | Gebele et al. | ..................... | 73/38 |
| 7,222,537 B2 | 5/2007 | Lehmann | | |
| 7,467,554 B2 | 12/2008 | Lehmann | | |
| 2003/0033857 A1 * | 2/2003 | Franks | .......................... | 73/49.3 |
| 2006/0065043 A1 * | 3/2006 | Cummings | .................... | 73/40.7 |
| 2006/0112759 A1 * | 6/2006 | Lehmann | ....................... | 73/49.2 |
| 2007/0212789 A1 * | 9/2007 | Havens et al. | ................. | 436/138 |
| 2009/0100909 A1 * | 4/2009 | Grosse Bley et al. | ......... | 73/40.7 |
| 2009/0241644 A1 * | 10/2009 | Bonfiglioli | ..................... | 73/49.3 |
| 2010/0067012 A1 * | 3/2010 | Tondello et al. | ............. | 356/437 |

(Continued)

FOREIGN PATENT DOCUMENTS

| | | |
|---|---|---|
| GB | 1 109 673 A | 4/1968 |
| GB | 1 598 426 A | 9/1981 |
| JP | 06-018355 | 1/1994 |

(Continued)

OTHER PUBLICATIONS

Merriam Webster Definition of "Manufacture", Accessed Nov. 2013.*

*Primary Examiner* — Peter Macchiarolo
*Assistant Examiner* — Alexander Mercado
(74) *Attorney, Agent, or Firm* — Oliff PLC

(57) ABSTRACT

For detected smallest leak in closed containers, which are at least to a part filled with a gas, the container (1) is pressurized by a test gas (g(s)) for an amount of time. The test gas (g(s)) comprises a gas species (s). The amount of the addressed gas species (s) which has penetrated in the container 1 it is sensed (7) as a leak indication.

12 Claims, 2 Drawing Sheets

(56) References Cited

U.S. PATENT DOCUMENTS

2011/0134431 A1* 6/2011 Yokobayashi et al. ....... 356/437
2013/0258346 A1* 10/2013 Tondello ..................... 356/437

FOREIGN PATENT DOCUMENTS

| JP | 10-185752 | 7/1998 | | |
|----|-----------|--------|----|----|
| JP | 2006-091004 | 4/2006 | | |
| JP | 2007-024600 | 2/2007 | | |
| JP | 2008-008910 | 1/2008 | | |
| WO | WO 2008053507 A2 * | 5/2008 | ............ | G01N 21/39 |

* cited by examiner

METHOD FOR LEAK TESTING CLOSED, AT LEAST PARTIALLY GAS FILLED CONTAINERS

RELATED APPLICATION

This application is a U.S. national phase application under 35 U.S.C. § 371 of International Application No. PCT/EP2009/058272 filed Jul. 1, 2009.

TECHNICAL FILED

The present invention is directed on a method for leak testing closed, at least partially gas filled containers, further on a method for manufacturing closed, at least partially gas filled containers which are unleaky and still further on an apparatus for leak testing such containers, thereby possibly as one station along a manufacturing plant for unleaky, at last partially gas filled containers.

BACKGROUND AND SUMMARY

For leak testing closed containers which are at least partially filled with a liquid product it is known from e.g. U.S. Pat. No. 5,907,093 of the same applicant as the applicant of the present application to expose respective containers to be leak tested to an external pressure which is at least as low as vapor pressure of a component of the liquid content in the container. This technique exploits the fact that liquid which is suctioned out through a leak in the container, evaporates resulting in a substantial increase of the pressure outside the container. Thereby, for such leak testing, the container under test is kept integral. Nevertheless, the addressed highly accurate testing method is limited to testing containers which are filled with a liquid product.

Leak testing methods and accordingly methods for manufacturing closed and filled containers which are unleaky and which are operated without harming integrity of the containers are of high interest e.g. for inline testing thereby determining which containers fulfill unleakiness conditions and which do not.

It is an object of the present invention to provide for a testing method, a manufacturing method and a respective apparatus as addressed above which are applicable to closed and filled containers irrespective whether the filling product is a solid, e.g. powderous, liquid or even gaseous. The only limiting factor is that the containers which are subjected to testing should at least partially be filled with a gas. Thereby, it should be considered that prefilled closed containers practically always have some percentage of their internal volume containing gas.

According to the present invention the method for leak testing closed, at least partially gas filled containers comprises subjecting a closed, at least partially gas filled container to an atmosphere of test gas at a pressure which is larger than pressure prevailing within the close, at least partially gas filled container, whereby the test gas comprises at least one gas species;

sensing after an amount of time the closed, partially gas filled container has been subjected to the atmosphere of test gas at the addressed pressure, the amount of at least the addressed gas species of the test gas within the closed, at least partially gas filled container as a leak indication.

Thus, an addressed container to be tested is subjected to an external pressure which is higher than the pressure prevailing within the container to be tested. This leads to gas or at least a gas species of the test gas to penetrate into the container to be tested which is on lower pressure. Sensing the amount of such gas species within the container which is kept integral and closed is exploited as a leak indication. The amount of gas which penetrates into the container is dependent of a leak being present or not, and if a leak is present, of the extent of such leak. By appropriately selecting the amount of time during which such container to be tested is subjected to the external overpressure of test gas and/or by appropriately selecting the amount of such overpressure and/or possibly also by selecting the gas species which are contained in the test gas, it becomes possible to detect extremely small leaks in the container, down to 1 μm diameter and less.

In one embodiment of the method according to the present invention, which may be combined with any of the subsequently addressed embodiments, a wall of the closed and at least partially gas filled container to be tested is selected to be transparent to light of a laser. The sensing thereby comprises subjecting the gas in the closed and at least partially gas filled container to the light of the beam of the laser, which beam being applied onto the addressed wall. The amount of gas species in the container is sensed from such light being transmitted through and/or being reflected from the closed and at least partially gas filled container.

Thereby, the selective absorption of light by the gas species in the container is exploited, e.g. according to a technique which is known from the U.S. Pat. No. 7,222,537 of the same applicant as the present application.

Although other techniques may be applied to sense or monitor whether during the time the container to be tested is exposed to the test gas atmosphere at the addressed high pressure, how much gas has penetrated into the container as e.g. a weighing technique etc the addressed laser technique has revealed to be highly suited as fast, accurate and relatively inexpensive.

In one embodiment of the method according to the present invention which may be combined with any embodiment addressed to now and subsequently addressed, the species in the test gas, is nominally not comprised in the gas within the closed, at least partially gas filled container. Thus, as an example, frequently the content of closed and filled containers should not come in contact with oxygen. This is e.g. the case for vials or syringes which contain medical substances.

In such a case, the test gas may comprise the addressed species—oxygen—and sensing comprises in fact monitoring in the container under test, whether such a gas species—oxygen—is present or not within the container after having been exposed to the pressurized test gas atmosphere with such species.

If on the other hand the container to be tested nominally does contain the gas species, the amount of which being sensed in the container and after its exposure to the test gas atmosphere with the addressed species and at the addressed elevated pressure, then sensing for the leak indication may comprise monitoring a difference or an increase of the amount of such gas species in the addressed container due to exposure to the test gas atmosphere.

In a further embodiment of the present invention, which may be combined with any of the formerly addressed embodiments as well as with any of the subsequently addressed embodiments, sensing comprises sensing at a first point of time and at least at a second deferred point of time and forming a difference of the amounts sensed at the addressed two or more points in time.

This embodiment is especially suited in the addressed case where the gas species to be sensed is nominally present in the container, but may also be applied in that case where nominally such gas species—e.g. oxygen—is not present in the container under test.

In one embodiment of the method according to the present invention which may be combined with any of the already addressed embodiments as well as with any of the subsequently addressed embodiments, the addressed sensing comprises sensing of the amount of gas species in the container while the container is subjected to the test gas atmosphere under the addressed pressure.

This e.g. allows terminating a testing cycle as soon as the addressed sensing reveals leakiness of the container.

In a further embodiment, which may be combined with any of the formerly addressed embodiments as well as with the embodiments to be subsequently addressed, the test gas comprises oxygen, is preferably air or oxygen enriched air.

In a further embodiment, which may be combined with any of the preaddressed embodiments as well as with any of the embodiments to be subsequently addressed, the closed, at least partially gas filled container to be tested is subjected to the test gas atmosphere at the addressed pressure during a predetermined amount of time.

By this embodiment it becomes possible to perform pressurizing of the container or of containers by the addressed test atmosphere remote from performing the addressed sensing. As will be subsequently addressed, this has e.g. the advantage that a batch of containers to be tested may be simultaneously subjected to the test gas atmosphere at the addressed pressure. Thereby, e.g. for in inline testing a stream of containers by the technique according to the invention feed through may substantially be increased, especially if additionally parallel batch processing is exploited.

It has further to be pointed out that sensing while the containers are subjected to the test gas atmosphere may be advantageously combined with a sensing after a predetermined amount of time in that such predetermined amount of time establishes for a time limit up to which sensing is performed, while the container or the containers are exposed to the test gas atmosphere. If after such predetermined amount of time sensing establishes that the monitored amount of gas species does not suffice to establish the container to be leaky, testing is ended and the respective container is considered unleaky.

In a further embodiment, which may be combined with any of the formerly addressed embodiments as well as with any of the subsequently addressed embodiments, a multitude of closed, at least partially gas filled containers—a batch of containers—is simultaneously subjected to the test gas atmosphere at the addressed overpressure.

Thereby and in a further embodiment the containers of the just addressed batch are exposed to the addressed sensing step, while a further batch of containers is subjected to test gas atmosphere.

Thereby, in one embodiment the addressed sensing is performed subsequently with respect to simultaneously subjecting the multitude of containers—the respective batch—to the test gas atmosphere at the addressed pressure. Such sensing is performed simultaneously upon a number of containers which is smaller than the number of the addressed multitude, that is of the addressed batch.

Such sensing, subsequent to batch subjecting to test gas atmosphere is e.g. performed upon one by one of the addressed containers. This taking into account that the sensing operation is normally much faster than the process step of subjecting the addressed container to the test gas atmosphere, especially if very small leaks are to be detected.

The method for manufacturing closed, at least partially gas filled containers which are unleaky and according to the present invention comprises
 providing a closed, at least partially gas filled container,
 subjecting this container to a testing method as was addressed above in one of any of its embodiments and establishing the container to be unleaky if the sensed amount is below a predetermined value.

The present invention is further directed on an apparatus for leak testing closed containers which comprises
 a biasing chamber for at least one container to be tested;
 a source of pressurized gas which is connected to the biasing chamber and
 a sensing arrangement for sensing the amount of a gas species in the closed container whereby the gas species as addressed is at least a part of the pressurised gas.

In one embodiment of the apparatus which may be combined with any of the preaddressed embodiments of the apparatus according to the invention and with any of the subsequently addressed embodiments, the gas comprises oxygen and in a further embodiment is air or oxygen-enriched air.

In one embodiment of the apparatus according to the present invention, which may be combined with any of the preaddressed embodiments of the apparatus as well as with any of the subsequently addressed embodiments, the sensing arrangement comprises a laser arrangement which generates a laser beam directed upon at least one of the addressed containers within the sensing arrangement.

In a further embodiment of the apparatus according to the invention, which may be combined with any of the preaddressed embodiments, at least a part of the sensing arrangement is operating within the biasing chamber.

In addition or alternatively and according to a further embodiment, at least a part of the sensing arrangement is provided remote from the biasing chamber.

In one embodiment of the apparatus, which may be combined with any of the formerly addressed embodiments or with any of the subsequently addressed embodiments, the biasing chamber is tailored to accommodate a batch of containers.

In one embodiment of the apparatus, which may be combined with any of the formerly addressed embodiments or with any of the subsequently addressed embodiments the apparatus comprises more than one of the biasing chambers.

Thereby and as a further embodiment a number of sensing arrangements is smaller than the number of biasing chambers.

The containers which are leak tested or which are manufactured according to the present invention or which are treated by the apparatus according to the invention are in one embodiment of glass or of a plastic material. They are further containers as e.g. vials or syringe bodies for medical application.

BRIEF DESCRIPTION OF DRAWINGS

The invention shall now be further exemplified with the help of figures. The figures show.

DETAILED DESCRIPTION

Figure 1:
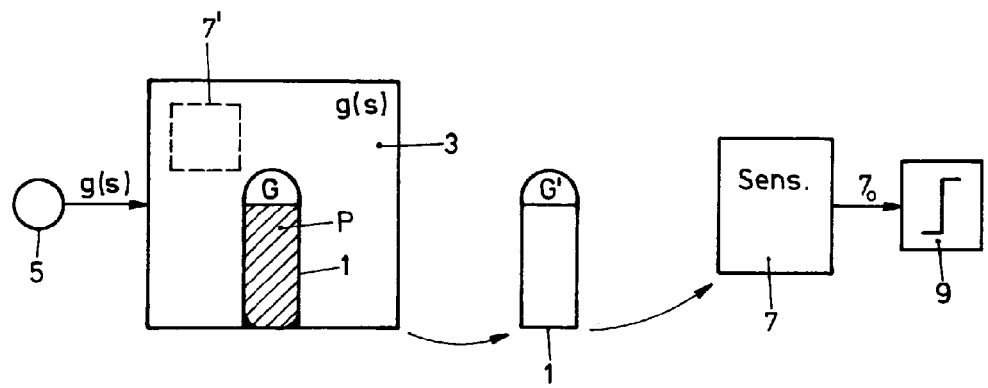
FIG. 1 most schematically, the principle of the methods according to the present invention and of an apparatus operating these methods.

In FIG. 1 there is schematically shown the principle of the present invention. A container 1 which is at least partially, i.e. to at least some extent, filled with a gas G is subjected to an atmosphere of test gas g(s). Beside of the part being filled with gas G the container 1 may contain a liquid or a solid e.g. a powderous product as addressed by P in FIG. 1. The container 1 which is e.g. a vial of plastic material or of glass is subjected to the atmosphere of test gas g(s) within a biasing chamber 3 which is pressurized with the test gas g(s) by a pressurizing source 5. The pressure established within biasing chamber 3 is higher than the pressure prevailing within the closed container 1 and thus within the gas G in the container 1. The pressure of the test gas g(s) within the biasing chamber 3 may be established as constant over time or varying in time, e.g. rising over time. The testing gas g(s) comprises at least one gas species s or consists of such a species s.

If the container 1 is leaky, the gas species s penetrates into the container 1. The amount of such species s penetrating into the container 1 during a time span considered and through a leak is dependent on one hand from the extent of the leak, then from the time span during which the container 1 is exposed to the test gas atmosphere, from the overpressure with which the test gas g(s) is applied by source 5 within biasing chamber 3 and may additionally be dependent from the gas species s.

Due to externally pressurizing container 1 to be tested by the testing gas g(s) with species s the container 1 will contain gas G' with an amount of the addressed gas species s or with an increased amount of such gas species s if the container to be tested contains before starting testing already an amount of such gas species s. Thus, if nominally the container 1 to be tested contains an amount of gas species s this amount will rise due to the addressed pressurizing if the container is leaky. If nominally the container to be tested does not contain the addressed gas species s, an amount of species s will be present in G' after pressurizing the container 1 in biasing chamber 3 and if the container is leaky.

There thus results as schematically shown in FIG. 1 that a container 1 which is leaky will contain in gas G' in any case an increased amount of gas species s compared with its status before being subjected to pressurizing in biasing chamber 3. The amount of gas species s in the gas G' contained in the container 1 after having been subjected to pressurizing in the biasing chamber 3 or at least after having been subjected to such pressurizing for some amount of time within biasing chamber 3 is sensed by a sensor arrangement 7. The sensed amount of gas species s is indicated by an output signal $7_o$ of sensing unit 7 which is evaluated in an evaluation unit 9. In the evaluation unit 9 the prevailing amount of gas species s in gas G' is evaluated, whether it is below a predetermined amount level which is acceptable for unleaky containers or not. If the prevailing amount of gas species s according to signal $7o$ is above such level, the container 1 is considered leaky.

Because the pressure with which a container 1 to be tested within biasing chamber 3 may be freely selected within a large range and further the amount of time during which the container 1 to be tested is exposed to overpressure of the test gas g(s) within biasing chamber 3 and, additionally, the composition of the test gas g(s) and thereby the species s may be selected, it becomes possible to detect extremely small leaks in the container 1. As shown in FIG. 1 in dash line at 7' sensing of the amount of gas species s within the container 1 may be performed already during subjecting the container 1 to the pressurized test gas g(s) within biasing chamber 3 and/or may be performed remote from the biasing chamber 3, i.e. after the container 1 to be tested having been removed from the biasing chamber 3.

Figure 2:
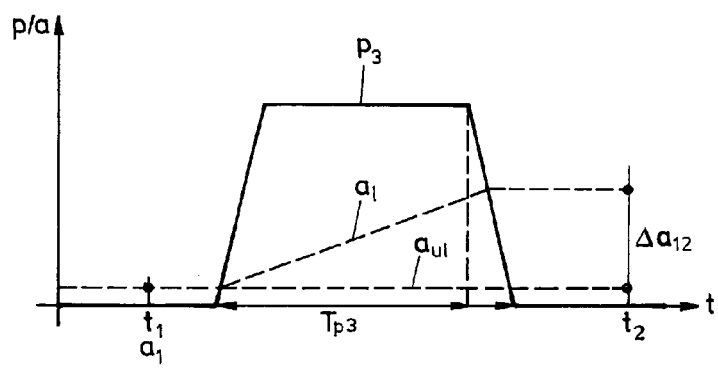
FIG. 2 over a time axis, quantitatively a first embodiment of test processing as performed by the methods and apparatus according to FIG. 1.

In FIG. 2 there is schematically shown over the time axis t a first embodiment of a testing cycle. Thereby sensing by sensing unit 7 as of FIG. 1 is performed remote from the biasing chamber 3 or at least after biasing chamber 3 having been relaxed from pressurized test gas.

According to this embodiment before subjecting the container 1 to be tested to pressurized test gas g(s) in biasing chamber 3, at $t_1$ the amount of gas species s present in container 1 is sensed by unit 7. In FIG. 2 this amount is denoted by $a_1$. Then the container 1 is subjected in the biasing chamber 3 to pressurizing with test gas g(s), e.g. with a pressure of several bars. This is shown in FIG. 2 by the pressure course $p_3$. If the container 1 under test is ideally unleaky, the amount $a_1$ of gas species contained in the gas G' in container 1 remains constant as shown by the dash course of amount $a_{u1}$ in FIG. 2.

On the other hand if the container is leaky, the amount of gas species s in the gas G' contained in container 1 rises as qualitatively shown by dash line course $a_1$. After a predetermined time span $T_{p3}$, during which the container has been subjected to test gas overpressure in biasing chamber 3, the chamber 3 is relaxed as shown by the course $p_3$ and the container under test 1 is removed from or kept within the relaxed biasing chamber 3. The amount of gas species s now present in the container 1 under test is sensed at a point of time $t_2$ according to FIG. 2. If the container is leaky there results, as indicated in FIG. 2 by $\Delta a_{12}$, a difference of sensed amounts between sensing at $t_2$ with respect to sensing at $t_1$. This difference $\Delta a_{12}$, which is represented by respective electrical signals of the sensing unit 7, is evaluated. As perfectly known to the skilled artisan it is compared with one or more than one threshold values to establish whether the container is only leaky to a possibly tolerable amount, and thus may be considered unleaky or is leaky to an intolerable amount and is thus to be considered leaky.

With an eye on FIG. 1 and if nominally the container does not contain the gas species s, sensing the amount of gas species s within the container only at $t_2$ suffices so as to establish leakiness or unleakiness of the container.

As may be seen when considering testing as exemplified in FIG. 2 it may not be excluded that the amount of gas species s in container 1 under test rises above a tolerable value already during such container being exposed to test gas pressurizing. Thereby, a decision about leakyness of the container will nevertheless only be established at the time $t_2$. This in spite of the fact that the content of gas species s in the container was already above a tolerable value long before the respective leakiness is recognized at $t_2$.

Therefore, it might be advisable to monitor the amount of gas species s within the container 1 under test already during such container being subjected to the pressurized test gas g(s) in the biasing chamber 3. This necessitates provision of a sensing unit 7 within the biasing chamber 3 as schematically shown at 7' of FIG. 1.

Figure 3:
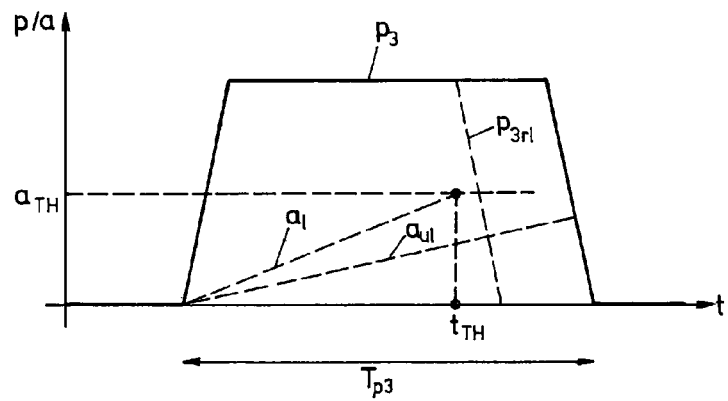
FIG. 3 in a representation in analogy to that of FIG. 2, a further embodiment of test processing by the addressed methods and of apparatus according to the invention, and FIG. 4 schematically, an embodiment of the methods and apparatus according to the invention, exploiting batch- and parallel-processing.

FIG. 3 shows in a representation similar to that of FIG. 2 a respective embodiment of testing processing. According to FIG. 3 and departing from the assumption that a container 1 to be tested nominally contains no gas species s, the container to be tested is subjected in biasing chamber 3 to pressurizing with test gas g(s) containing the gas species s. This is again shown in FIG. 3 by the pressure course $p_3$. There is established a threshold value $a_{TH}$ for an amount of gas species s within the container under test which value is the limit value tolerable for a container being considered unleaky. During pressurizing the container under test the amount of gas species s in the container 1 is monitored by a respective sensing unit 7' within biasing chamber 3. The course $a_l$ represents in FIG. 3 the amount of gas species s in the container 1 within the biasing chamber 3 as sensed and monitored by such sensing unit 7'. The prevailing amount is compared with the threshold value $a_{TH}$. As soon as the prevailing amount $a_l$ reaches the threshold value $a_{TH}$, which is the case according to FIG. 3 at the time $t_{TH}$, the container under test is undoubtedly leaky and the biasing chamber 3 is relaxed as shown in FIG. 3 by the dash line $p_{3r1}$. Testing of the respective container is terminated. If the container under test is unleaky or only leaky in a tolerable amount, the amount of gas species s in the container 1 may rise as schematically shown in FIG. 3 by the dash line course $a_{u1}$. The maximum time span for pressurizing the container 1 is predetermined as shown by $T_{p3}$. Thus, if after lapse of $T_{p3}$ the course of amount of gas species s within container 1 does not reach the threshold value $a_{TH}$, the test cycle for the container is terminated and the container is considered unleaky.

The skilled artisan becomes aware of different further possibilities of test processing according to the present invention as by combined processing according to FIG. 2 with processing according to FIG. 3 and he may accordingly tailor respective testing apparatus and timing control thereof.

With an eye on FIG. 1 and considering the fact that at a predetermined pressure applied within biasing chamber 3 the accuracy of leak detection is significantly dependent on the time extent during which a container is subjected to the pressurized test gas g(s), it becomes evident that duration of the overall test processing is predominantly governed by the time span of exposing the container 1 to the pressurizing test gas g(s).

On the other hand in a multitude of applications for such testing according to the present invention it is highly desirable to test containers in inline mode without reducing feedthrough of containers.

This may be realized, still making use of the present invention, on one hand by subjecting simultaneously a multitude of containers i.e. a batch of containers to test gas pressurizing and subsequently subjecting the containers having been pressurized as a batch, one after the other to the sensing step. Thereby, during the time span the containers of one batch are subjected to the sensing step in a high-rate sequence, a second batch of containers is subjected to pressurizing. Thus, the slower processing step, namely pressurizing, is performed in batch technique and in parallel processing technique. This is schematically exemplified in FIG. 4.

Figure 4:
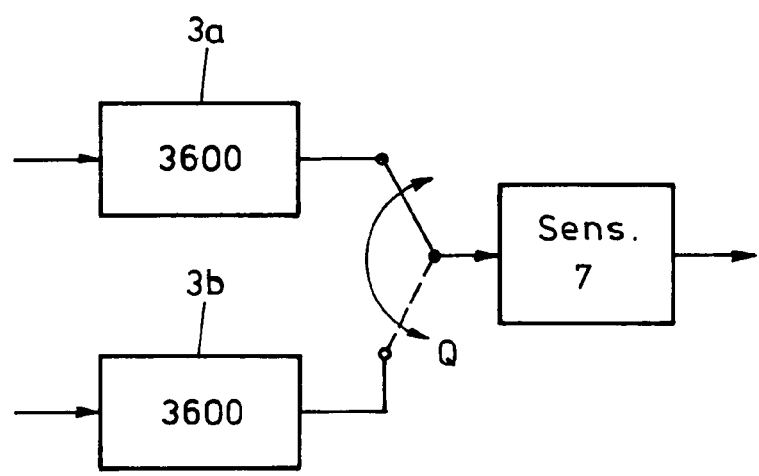

According to FIG. 4 a first biasing chamber 3a is loaded with a batch of a multitude of containers to be tested, as an example with 3,600 containers. The batch of containers within biasing chamber 3a is subjected during one hour to the pressurizing test gas as was addressed in context with FIG. 1. After one hour the biasing chamber 3a is relaxed and the containers of the batch are fed e.g. one by one to the sensing station 7. If the sensing station 7 as an example necessitates one second for accurately sensing the amount of gas species s contained in a container of the batch sensing all the containers of the batch will last one hour at a feedthrough rate of 1 container per second. During the one hour which is necessary to terminate processing of the containers of the batch from biasing chamber 3a by sensing unit 7, a second batch of an equal number of containers is subjected to test gas pressurizing in a second biasing chamber 3b. Thus, after termination processing of the containers from biasing chamber 3a, the second batch in the second biasing chamber 3b has been subjected to pressurized test gas during one hour and is ready for being sensed. The input of sensing unit 7 is switched to the output of the second biasing chamber 3b which is relaxed and wherefrom the containers are now fed to the sensing unit 7. This is schematically shown by the throw-over switch Q in FIG. 4.

As was addressed the sensing unit 7 performs sensing the amount of a gas species s within the closed container. Most suited for such a task is exploitation of spectrally selective light absorption by a respective species of gas. This principal is exploited by selecting as a sensing unit 7 a unit in which light of a laser beam is directed upon the gas filled part of a container 1 to be sensed and the amount of a gas species is evaluated from the light of the laser beam being transmitted or being reflected out of the container and after having been subjected to the gas G' contained in the container. Thereby, the wall of the container 1 is selected to be transparent to the addressed light. A technique for monitoring the amount of a gas species in such a container is amply disclosed e.g. in the U.S. Pat. No. 7,467,554 of the applicant of the present application. In a today preferred embodiment of the methods according to the present invention and of the respective apparatus which performs such methods the gas species s is selected to be oxygen. Thereby, the test gas g(s) is selected to be air or oxygen enriched air. The addressed leak testing and manufacturing technique and the according apparatus are highly suited for testing or manufacturing, thereby also inline testing and inline manufacturing at least partially gas filled containers, thereby especially glass wall or transparent plastic material containers, e.g. vials, containers for medical contents. By applying the addressed method making use of oxygen as the gas species, thereby subjecting a container to be tested to atmosphere overpressure during about 20 min. it became at first go possible to detect leaks as small as 1 μm. It is strongly believed that by respectively optimizing overall processing, leaks will become detectable which are significantly smaller than 1 μm without unduly limiting feedthrough of containers in inline testing by applying respective batch and parallel processing techniques.

The invention claimed is:

1. A method for leak testing closed, at least partially gas filled containers with respect to leakiness to a gas species included in a test gas, the method comprising
   simultaneously subjecting a batch comprising a multitude of closed, at least partially gas filled containers, for a selected amount of time in a biasing chamber, to said test gas at a pressure that is larger than a pressure prevailing within said closed, at least partially gas filled containers, thereby amplifying, by said larger pressure, a leak rate of said gas species into each container of said batch when a leak is present, and amplifying, by said selected amount of time, an amount of said gas species that leaked into each container of said batch when said leak is present;
   subsequently subjecting each container of said batch to sensing an amount of said gas species within each of said closed, at least partially gas filled containers of said batch as a leak indication; and determining whether said leak is present in a certain one of said closed, at least partially gas filled containers based on the amount of said species gas sensed within said certain one of said closed, at least partially gas filled containers, wherein:

said sensing is performed remote from said biasing chamber, and said sensing is performed while subjecting another batch of closed, at least partially gas filled containers in said biasing chamber to said test gas at said larger pressure, a wall of each of said closed, at least partially gas filled containers of said batch is transparent to light of a laser, and said sensing includes simultaneously performing, in a series: (i) sensing of a number of said containers of said batch by subjecting gas in each of said closed, at least partially gas filled containers of said number of containers of said batch to light of laser, and (ii) exploiting light of said laser being at least one of: transmitted through each of the containers of said number of containers of said batch, and reflected from each of the containers of said number of containers of said batch, and a value of at least one of: said gas species, said larger pressure, and said amount of time, is selected such that leaks having a diameter of 1 μm and greater are detected.

2. The method of claim 1, wherein said closed, at least partially gas filled containers contain said gas species below a predetermined amount when no leak is present.

3. The method of claim 1, wherein said sensing comprises sensing at a first point of time and at a second deferred point of time and forming a difference of amounts sensed at said two points of time.

4. The method of claim 1, wherein said gas species is oxygen, and said test gas is air or oxygen enriched air.

5. The method of claim 1, wherein said containers comprise at least substantially no oxygen when no leak is present.

6. A method for manufacturing closed, at least partially gas filled containers that do not include leaks, the method comprising:

manufacturing closed, at least partially gas filled containers;

subjecting said containers to a testing method according to one of claims 1, 2, 3, 4 and 5; and selecting only those at least partially gas filled containers as said at least partially gas filled containers that do not include leaks for which said sensed amount of oxygen is below a predetermined value.

7. An apparatus for leak testing closed, at least partially gas filled containers, the apparatus comprising:

a biasing chamber configured to accommodate a batch including a multitude of containers to be tested;

a time controlled source of pressurized test gas comprising a gas species connected to said biasing chamber, and providing in said biasing chamber a pressure of said gas species higher than a pressure of said gas species in said containers for a selected amount time; and a sensing arrangement remote from said biasing chamber configured to sense an amount of said gas species in said closed containers, the sensing arrangement including a laser arrangement generating a laser beam directable upon each container within said sensing arrangement, wherein:

said sensing arrangement is configured to simultaneously perform sensing of a number of said containers, which is smaller than a number of said multitude of said containers, and a value of at least one of: said gas species, said pressure of said gas species, and said selected amount of time, is selected such that leaks having a diameter of 1 μm and greater are detected.

8. The apparatus of claim 7, wherein said pressurized test gas is air or oxygen-enriched air.

9. The apparatus of claim 7, further comprising more than one of said biasing chambers.

10. The method of claim 1, wherein said simultaneously sensing, in series, of said number of containers of said batch, which is smaller than said number of said multitude of said batch, is completed within said selected amount of time.

11. The apparatus of claim 7, wherein the sensing arrangement is configured such that simultaneously performing, in a series, sensing of said number of containers of said batch, which is smaller than said number of said multitude of said batch, is completed within said selected amount of time.

12. A method for leak testing closed, at least partially gas-filled containers with respect to leakiness of oxygen in an ambient gas atmosphere, the method comprising:

providing said closed, at least partially gas-filled containers to be transparent to light of a laser; and sensing an amount of oxygen within said closed, at least partially gas-filled containers by subjecting said containers to light of said laser and exploiting that said light of said laser is at least one of transmitted through and reflected from said containers as an indication for said leakiness, wherein the method includes amplifying leak indicative information within said transmitted or reflected light with respect to said leakiness of oxygen in said ambient gas atmosphere by grouping a multitude of said containers to be tested to a batch of containers;

exposing said batch of containers in an atmosphere of a test gas with increased partial oxygen pressure relative to said ambient atmosphere for an amount of time; and subjecting after said exposing each of said containers from said batch to said light of said laser; and a value of at least one of: said increased partial oxygen pressure and said amount of time, is selected such that leaks having a diameter of 1 μm and greater are detected.

* * * * *